(12) United States Patent
Chen

(10) Patent No.: US 12,437,207 B2
(45) Date of Patent: Oct. 7, 2025

(54) METHOD FOR SELECTING TASK NETWORK, SYSTEM AND METHOD FOR DETERMINING ACTIONS BASED ON SENSING DATA

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 1117 days.

(21) Appl. No.: 17/148,586

(22) Filed: Jan. 14, 2021

(65) Prior Publication Data

US 2022/0138587 A1 May 5, 2022

(30) Foreign Application Priority Data

Nov. 4, 2020 (TW) ................. 109138475

(51) Int. Cl.
*G06N 3/126* (2023.01)
*G06F 18/21* (2023.01)
(Continued)

(52) U.S. Cl.
CPC ....... *G06N 3/126* (2013.01); *G06F 18/21342* (2023.01); *G06F 18/217* (2023.01); *G06F 18/2413* (2023.01)

(58) Field of Classification Search
CPC . G06N 3/126; G06F 18/217; G06F 18/21342; G06F 18/2413
See application file for complete search history.

(56) References Cited

U.S. PATENT DOCUMENTS

| 10,776,691 B1 | 9/2020 | Ghahramani et al. |
| 11,117,762 B2 | 9/2021 | Kanada |
| (Continued) | | |

FOREIGN PATENT DOCUMENTS

| CN | 111813500 | 10/2020 |
| JP | 2020170952 | 10/2020 |

OTHER PUBLICATIONS

Stanley et al., "A Hypercube-Based Indirect Encoding for Evolving Large-Scale Neural Networks", 2009 (Year: 2009).*
(Continued)

*Primary Examiner* — Reji Kartholy
(74) *Attorney, Agent, or Firm* — JCIPRNET

(57) ABSTRACT

The embodiments of the disclosure provide a method for selecting a task network, a system and a method for determining actions based on sensing data. The method of the embodiments of the disclosure includes: mapping the sensing data into an input feature vector; feeding the input feature vector into a specific task network to generate an output feature vector via the specific task network, in which the specific task network is trained based on a plurality of first individuals and a plurality of second individuals, the first individuals belong to a first population, the second individuals belong to a second population, and the first individuals and the second individuals are evolved via a coevolution process; and determining an output action according to the output feature vector, and setting a second specific individual based on the output action, in which the second specific individual belongs to the second population.

15 Claims, 8 Drawing Sheets

(51) Int. Cl.
   *G06F 18/2134*    (2023.01)
   *G06F 18/2413*    (2023.01)

(56) References Cited

U.S. PATENT DOCUMENTS

| | | | |
|---|---|---|---|
| 2018/0114116 A1* | 4/2018 | Liang | G06N 3/04 |
| 2019/0019197 A1* | 1/2019 | Roberts | G06Q 10/067 |
| 2019/0088014 A1* | 3/2019 | Richards | G06T 19/00 |
| 2019/0180188 A1* | 6/2019 | Liang | G06N 3/086 |
| 2020/0143243 A1* | 5/2020 | Liang | G06N 3/045 |
| 2020/0226750 A1* | 7/2020 | Shafiee | G06T 7/0012 |
| 2020/0272908 A1* | 8/2020 | Shahrzad | G06N 3/126 |
| 2020/0317458 A1 | 10/2020 | Kanada | |
| 2021/0110302 A1* | 4/2021 | Nam | G06N 5/01 |
| 2022/0051076 A1* | 2/2022 | Bingham | G06N 3/086 |

OTHER PUBLICATIONS

Garcia-Pedrajas et al. "Cooperative Coevolution of Artificial Neural Network Ensembles for Pattern Classification" (Year: 2005).*

"Office Action of Taiwan Counterpart Application", issued on Oct. 25, 2021, p. 1-p. 12.

Sreenivas Sremath Tirumala, "Evolving deep neural networks using coevolutionary algorithms with multi-population strategy", Neural Computing and Applications, Feb. 1, 2020, pp. 13051-13064.

Jonathan C. Brant et al., "Minimal criterion coevolution: a new approach to open-ended search", GECCO '17: Proceedings of the Genetic and Evolutionary Computation Conference, Jul. 15, 2017, pp. 67-74.

"Search Report of Europe Counterpart Application", issued on Sep. 14, 2021, p. 1-p. 11.

Kenneth O. Stanley et al., "A Hypercube-Based Indirect Encoding for Evolving Large-Scale Neural Networks", Artificial Life Journal, Mar. 5, 2009, pp. 1-39, vol. 15, No. 2.

"Office Action of Europe Counterpart Application", issued on Aug. 9, 2023, p. 1-p. 11.

Andreas Pavlogiannis et al., Construction of arbitrarily strong amplifiers of natural selection using evolutionary graph theory, communications biology, vol. 1, No. 71, Jun. 14, 2018, pp. 1-8.

Jonathan C. Brant, "Diversity Preservation in Minimal Criterion Coevolution through Resource Limitation," Mar. 29, 2020, pp. 1-6, Available at: https://github.com/jbrant/MinimalCriterionCoevolution/releases/.

"Office Action of Japan Counterpart Application", issued on Jun. 21, 2022, p. 1-p. 2.

* cited by examiner

METHOD FOR SELECTING TASK NETWORK, SYSTEM AND METHOD FOR DETERMINING ACTIONS BASED ON SENSING DATA

CROSS-REFERENCE TO RELATED APPLICATION

This application claims the priority benefit of Taiwan application serial no. 109138475, filed on Nov. 4, 2020. The entirety of the above-mentioned patent application is hereby incorporated by reference herein and made a part of this specification.

BACKGROUND

Technical Field

The disclosure relates to a neural network technology, and in particular to a method for training and selecting a task network based on a coevolution mechanism, and a system and a method for determining actions based on sensing data.

Description of Related Art

Evolution on the earth is an open process, and coevolution often occurs between individuals that belong to different species. Take the two species of "giraffes" and "trees" as an example. In order not to be eaten up by giraffes and to receive more sunlight, the offspring of trees with higher crowns tend to be retained during the evolution process. On the other hand, in order to eat the leaves at higher crowns, the offspring of giraffes with longer necks also tend to be retained during the evolution process.

In the current fifth-generation communications system (hereinafter referred to as 5G), although roles similar to the concepts of "giraffes" and "trees" as described above exist, the coevolution concept does not exist between these roles. Therefore, the coevolution process may not currently be used to improve the performance of the roles.

For example, the "closed-loop control" in 5G (such as the near-RT RAN intelligent controller in the open radio access network (O-RAN)) and the "open-loop control" (such as non-RT RAN intelligent controller in O-RAN) have a certain degree of correlation with each other; however, the related parameter(s)/configuration value(s) of the two do not have the characteristics of coevolution. Therefore, the "closed-loop control" and the "open-loop control" may not be improved (such as reaching a lower operational expenditure (OPEX) and improved operational network functions (OPNF)) via the coevolution process.

In addition, a similar condition exists between "user behavior" and "network topology" in 5G. For example, general user behavior may include parameter(s)/configuration value(s) such as traffic, bandwidth, latency, power consumption, coverage, and connection, and users generally hope that the parameter(s)/configuration value(s) may develop into a large traffic, a high bandwidth, a low latency, a low power consumption, a large coverage, and a stable connection. In addition, the network topology may include parameter(s)/configuration value(s) such as the number of nodes, power consumption, the number of links, heat generation, etc. Operators generally tend to adopt a network topology with a small number of nodes, a low power consumption, a small number of links, and a low heat generation. However, although "user behavior" and "network topology" have a certain degree of correlation with each other, the related parameter(s)/configuration value(s) of the two do not have the characteristics of coevolution. Therefore, the "user behavior" and the "network topology" may not be improved via the coevolution process.

SUMMARY

In view of this, the embodiments of the disclosure provide a method for training and selecting a task network based on a coevolution mechanism and a system and method for determining action(s) based on sensing data.

The embodiments of the disclosure provide a method for training and selecting a task network based on a coevolution mechanism, including: obtaining a plurality of first individuals that belong to a first population and a plurality of second individuals that belong to a second population, in which the first individuals and the second individuals are evolved via a coevolution process; obtaining a plurality of task networks generated by a plurality of pattern-producing networks; training each of the task networks with the first individuals and the second individuals based on a multi-target function, and evaluating an accuracy of each of the task networks after training, in which the multi-target function includes a plurality of characteristics of each of the task networks; determining a fitness score of the corresponding pattern-producing network based on the accuracy of each of the task networks, in which the fitness score of each of the pattern-producing networks is positively correlated to the accuracy of the task network that corresponds to the pattern-producing network; and finding a specific pattern-producing network from the pattern-producing networks based on the fitness score of each of the pattern-producing networks, and selecting a specific task network that corresponds to the specific pattern-producing network among the task networks.

The embodiments of the disclosure provide a method for determining action(s) based on sensing data, including: obtaining sensing data and mapping the sensing data into an input feature vector, in which the sensing data include a plurality of sensing attributes that belong to a first specific individual, and the first specific individual belongs to a first population; feeding the input feature vector into a specific task network, so that the specific task network generates an output feature vector, in which the specific task network is trained based on the first population and a second population, the first individuals belong to the first population and the second individuals belong to the second population, and the first individuals and the second individuals are evolved via a coevolution process; and determining an output action according to the output feature vector, and setting a second specific individual based on the output action, in which the second specific individual belongs to the second population.

The embodiments of the disclosure provide a system for determining action(s) based on sensing data, including a sensing circuit, a communication circuit, a storage circuit, and a processor. The storage circuit records a plurality of modules. The processor is coupled to the storage circuit and accesses the modules to execute the following: obtaining sensing data from the sensing circuit, and mapping the sensing data into an input feature vector, in which the sensing data include a plurality of sensing attributes that belong to a first specific individual, and the first specific individual belongs to a first population; feeding the input feature vector into a specific task network so that the specific task network generates an output feature vector, in which the specific task network is trained based on the first population and a second population; and determining an output action according to the output feature vector, and controlling the communication circuit to send the output action to a second specific individual that belongs to the second population, in which the output action is configured to set the second specific individual.

DESCRIPTION OF THE EMBODIMENTS

Figure 1:
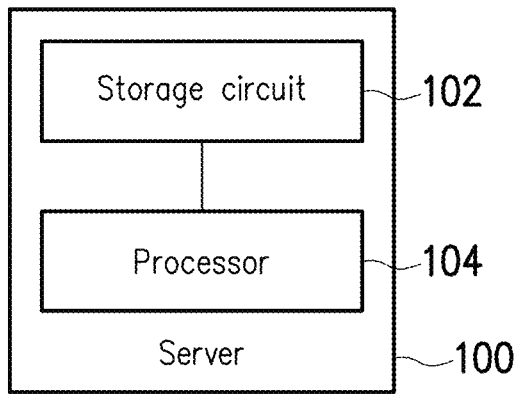
FIG. 1 is a schematic diagram of a server according to an embodiment of the disclosure.

Referring to FIG. 1, which is a schematic diagram of a server according to an embodiment of the disclosure, in FIG. 1, a server 100 may include a storage circuit 102 and a processor 104. The storage circuit 102 is, for example, any type of fixed or portable random access memory (RAM), read-only memory (ROM), flash memory, hard disk, other similar devices, or a combination of these devices and may be configured to record a plurality of codes or modules.

The processor 104 is coupled to the storage circuit 102, and may be a general-purpose processor, a special-purpose processor, a conventional processor, a digital signal processor, a plurality of microprocessors, one or more microprocessors combined with the core of a digital signal processor, a controller, a microcontroller, an application specific integrated circuit (ASIC), a field programmable gate array (FPGA), any other types of integrated circuit, a state machine, and a processor based on an advanced RISC machine (ARM) and similar products.

In an embodiment of the disclosure, the processor 104 may access modules and program codes recorded in the storage circuit 102 to realize the method for training and selecting a task network based on a coevolution mechanism proposed by the disclosure. The details are as follows.

Figure 2:
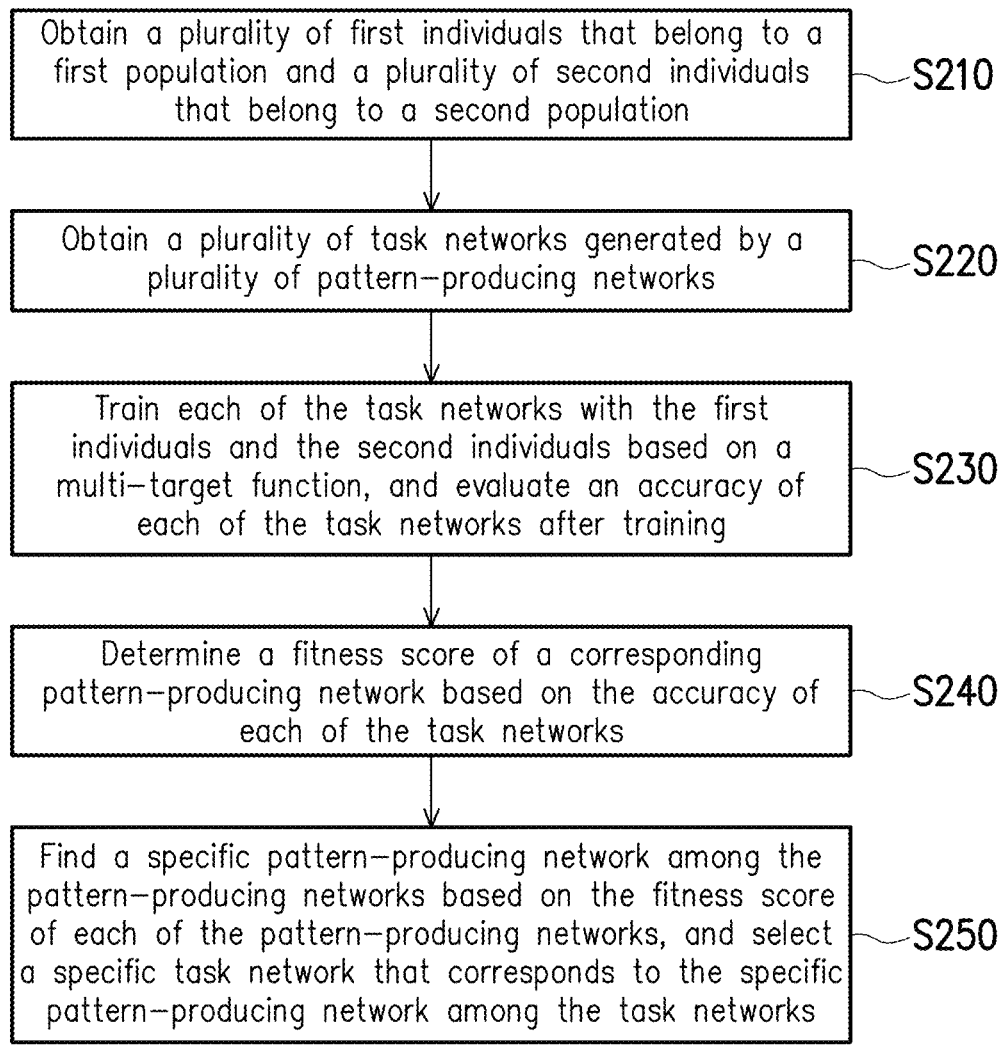
FIG. 2 is a flowchart of a method for training and selecting a task network based on a coevolution mechanism according to an embodiment of the disclosure.

Referring to FIG. 2, FIG. 2 is a flowchart of a method for training and selecting a task network based on a coevolution mechanism according to an embodiment of the disclosure. The method of this embodiment may be executed by the server 100 in FIG. 1. The details of each step in FIG. 2 will be described below with reference to the components shown in FIG. 1.

First, in step S210, the processor 104 may obtain a plurality of first individuals that belong to a first population and a plurality of second individuals that belong to a second population.

In the first embodiment of the disclosure, the first population and the second population are, for example, a "closed-loop control" and an "open-loop control" in 5G, respectively. Under this circumstance, the first individuals that belong to the first population may be a control function or a trained model respectively, and each of the plurality of first individuals may have a plurality of different first genes.

Taking a first individual that belongs to the control function as an example, first genes thereof includes, for example, quality of service management (QoS management), connectivity management, a seamless handover control, etc., but is not limited thereto.

QoS management may include but is not limited to parameter(s)/configuration value(s) such as throughput, end-to-end latency, network availability, and reliability parameters. Connectivity management may include but is not limited to parameter(s)/configuration value(s) such as an upstream/downstream data rate, an upstream/downstream area traffic capacity, and an overall user density. The seamless handover control may include but is not limited to parameter(s)/configuration value(s) such as a maximum speed for handover.

In addition, taking a first individual that belongs to the trained model as an example, first genes thereof are, for example but not limited to, an artificial intelligence/machine learning model.

In the first embodiment, each of the first genes of the first individuals may be, for example, stored in a database in the form of a specific data structure (such as an array). For example, the data structure that corresponds to the first individual that belongs to the control function may include a plurality of fields that correspond to the genes, such as QoS management, connectivity management, the seamless handover control, etc. The fields may be, for example, configured to record the above various parameters/configuration values, but the disclosure is not limited thereto.

In addition, the plurality of second individuals that belong to the second population may be a policy, an intent, or a RAN analytic respectively, and each of the second individuals may have a plurality of different second genes.

Taking a second individual that belongs to the policy as an example, second genes thereof include, for example, a sub-policy. Taking a second individual that belongs to the intent as an example, second genes thereof include, for example, action(s) and parameter change(s). Taking a second individual that belongs to the RAN analytic as an example, second genes thereof include, for example, analytics and learning tasks.

In the first embodiment, each of the second genes of the second individuals may be, for example, stored in a database in the form of a specific data structure. For example, the data structure that corresponds to the second individual that belongs to the policy may include a plurality of fields that correspond to the genes, such as the sub-policy, etc. The fields may be, for example, configured to record various parameters/configuration values related to the sub-policy, but the disclosure is not limited thereto.

Those skilled in the art may refer to specifications of 5G for related descriptions of the first genes of the first individuals and the second genes of the second individuals in the first embodiment, and the details in this regard will not be repeated herein.

In a second embodiment, the first population and the second population are, for example, a "user behavior" and a "network topology" in 5G, respectively. Under this circumstance, the first individuals that belong to the first population may include various first genes that are related to the user behavior, and the second individuals that belong to the second population may include various second genes that are related to the network topology.

For example, the first individuals that belong to the first population may include parameter(s)/configuration value(s) such as a user experience, a user habit, a user type, a user density, and a user context, but the disclosure is not limited thereto. In addition, the second individuals that belong to the second population may include parameter(s)/configuration value(s) such as a radio unit (RU), a distributed unit (DU), a central unit (CU), and a mobile edge computing (MEC) server, but the disclosure is not limited thereto.

In the second embodiment, each of the first genes of each of the first individuals and each of the second genes of each of the second individuals may be, for example, stored in a database in the form of a specific data structure. Related descriptions may be found in the first embodiment, and details in this regard will not be repeated in herein.

Figure 3:
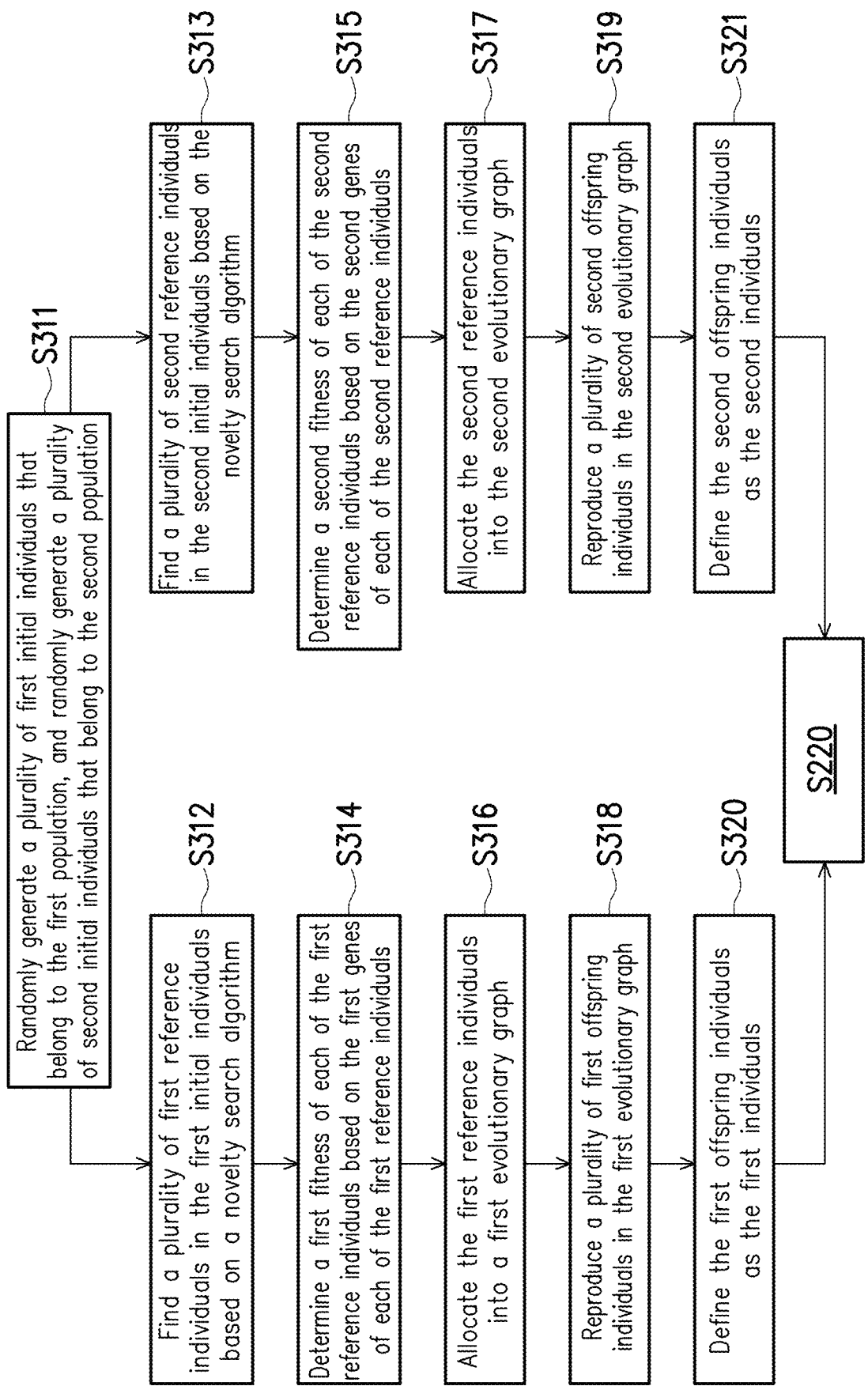
FIG. 3 is a flowchart of obtaining a plurality of first individuals and a plurality of second individuals according to an embodiment of the disclosure.

In an embodiment, the first individuals that belong to the first population and the second individuals that belong to the second population may be evolved via a coevolution process, which will be further explained with reference to FIG. 3 in the following. Referring to FIG. 3, FIG. 3 is a flowchart of obtaining a plurality of first individuals and a plurality of second individuals according to an embodiment of the disclosure.

First, in step S311, the processor 104 may randomly generate a plurality of first initial individuals that belong to the first population, and randomly generate a plurality of second initial individuals that belong to the second population. Each of the first initial individuals, just like each of the first individuals, has first genes, and each of the second initial individuals, just like each of the second individuals, has second genes. Under this circumstance, parameter(s)/configuration value(s) of each of the first/second genes in the first initial individuals and the second initial individual is, for example but not limited to, a random value.

Next, in step S312, the processor 104 may find a plurality of first reference individuals in the first initial individuals based on a novelty search algorithm, and the first genes of each of the first reference individuals may satisfy a first minimal criterion (MC). In an embodiment, the processor 104 may find the first reference individuals among the first initial individuals based on a K nearest neighbors (KNN) algorithm. Under this circumstance, each of the first reference individuals found has a certain degree of difference among each other, and related details of the novelty search and the KNN may be found in related technical documents, and details in this regard will not be repeated herein.

In addition, as described above, each of the first reference individuals further satisfies a corresponding first MC. Taking the first embodiment as an example, the first MC that the first reference individuals that belong to the first population (for example, a control function or a trained model) need to satisfy is, for example but not limited to, the ability to be configured to perform a corresponding closed-loop control (for example, each of the genes having reasonable parameter(s)/configuration value(s)).

Taking the second embodiment as an example, the first MC that the first reference individuals that belong to the first population (such as the user behavior) need to satisfy is, for example but not limited to, parameter(s)/configuration value(s) such as having a reasonable user experience (for example, requiring a short response time), user habit (for example, accustomed to daytime use), user type (for example, young people), user density (for example, a high density), and user context (for example, augmented reality (AR)).

Based on a similar concept, in step S313, the processor 104 may also find a plurality of second reference individuals in the second initial individuals based on the novelty search algorithm. That is, the processor 104 may find the second reference individuals among the second initial individuals based on the KNN algorithm, so that the second reference individuals found have a certain degree of difference among each other.

In addition, the second genes of each of the second reference individuals may satisfy a second MC. Taking the first embodiment as an example, the second MC that the second reference individuals that belong to the second population (for example, a policy, an intent or a RAN analytic) need to satisfy is, for example but not limited to, the ability to be configured to perform a corresponding open-loop control (for example, each gene having reasonable parameter(s)/configuration value(s)).

Taking the second embodiment as an example again, the second MC that the second reference individuals that belong to the second population (for example, network topology) need to satisfy is, for example but not limited to, parameter(s)/configuration value(s) such as having a reasonable RU (for example, a large number of RU), DU (for example, a low energy consumption), CU (for example, a high computational amount), and MEC server (for example, a large number of MEC servers).

After the first reference individuals that belong to the first population and the second reference individuals that belong to the second population are obtained based on the teaching, the first reference individuals and the second reference individuals may be configured to undergo the coevolution process proposed in the embodiments of the disclosure, which will be further described in the following.

Next, in step S314, the processor 104 may determine a first fitness of each of the first reference individuals based on the first genes of each of the first reference individuals, and in step S315, the processor 104 may determine a second fitness of each of the second reference individuals based on the second genes of each of the second reference individuals.

Generally, the coevolution process may be roughly divided into a cooperative coevolution (such as between "orchids" and "moths") and a competitive coevolution (such as between "giraffes" and "trees"). In the first embodiment of the disclosure, since the common goals of the first population and the second population are to increase the OPNF and decrease the OPEX, the coevolution of the first population and the second population may be regarded as the cooperative coevolution.

Under this circumstance, the first reference individuals and the second reference individuals that may increase the OPNF and decrease the OPEX may have a higher corresponding first/second fitness.

On the other hand, in the second embodiment of the disclosure, the goals of the first population (for example, a large traffic, a high bandwidth, a low latency, a low power consumption, a large coverage, and a stable connection) roughly conflict with the goals of the second population (for example, a smaller number of nodes, a lower power consumption, a smaller number of links, and a lower heat generation). Therefore, the coevolution of the first population and the second population may be regarded as the competitive coevolution.

Under this circumstance, the first reference individuals that have a large traffic, a high bandwidth, a low latency, a low power consumption, a large coverage, and a stable connection may have a higher corresponding first fitness. In contrast, the second reference individuals that have a smaller number of nodes, a lower power consumption, a smaller number of links, and a lower heat generation may have a higher corresponding second fitness.

After the first fitness of each of the first reference individuals is determined, in step S316, the processor 104 may allocate the first reference individuals into a first evolutionary graph. In different embodiments, the designer may select a suitable evolutionary graph as the first evolutionary graph according to the needs.

Figure 4:
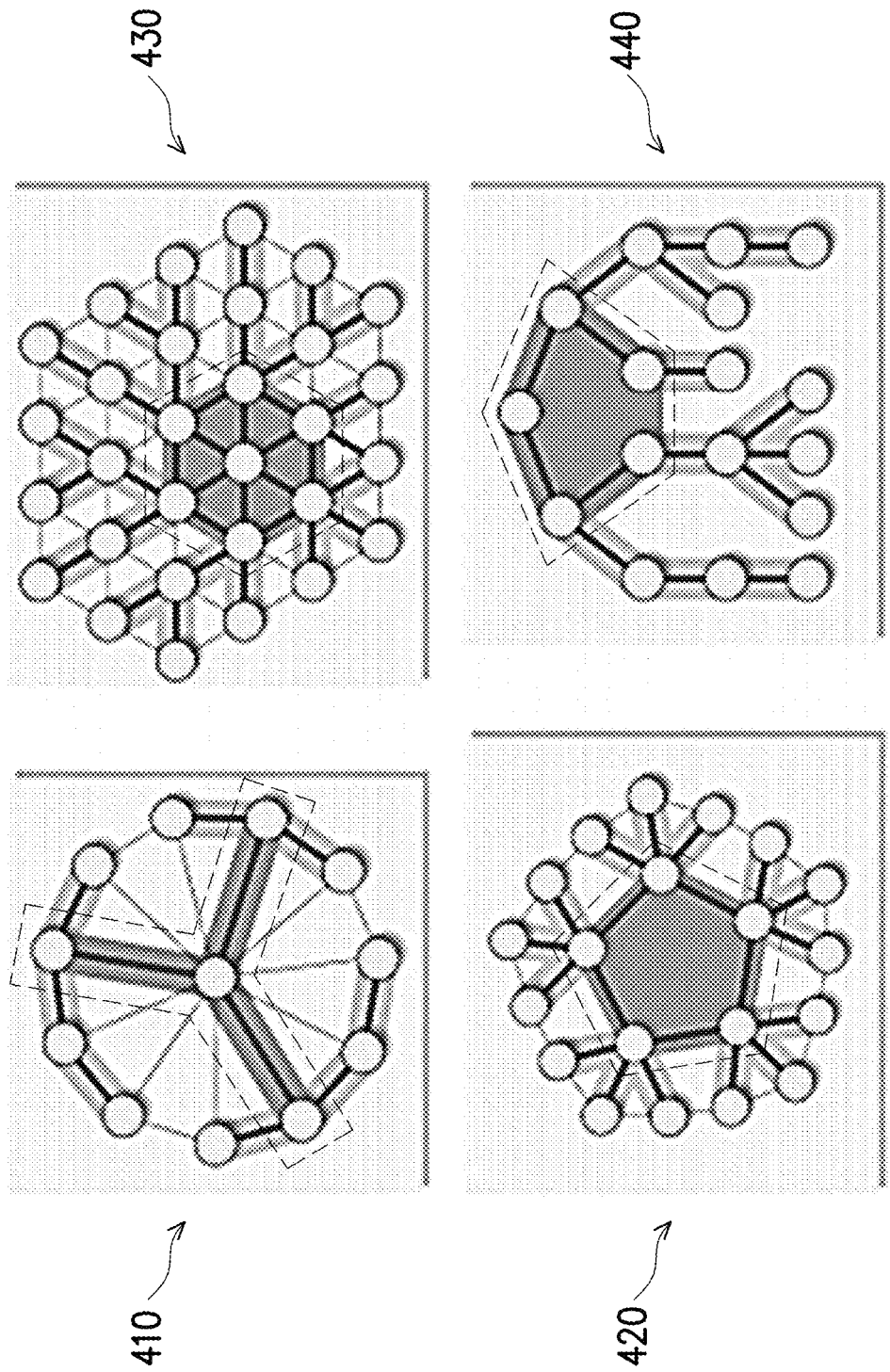
FIG. 4 shows different types of evolutionary graphs according to an embodiment of the disclosure.

Referring to FIG. 4, FIG. 4 shows different types of evolutionary graphs according to an embodiment of the disclosure. FIG. 4 shows a total of 4 different evolutionary graphs 410 to 440. In each of the evolutionary graphs 410 to 440, a plurality of nodes (shown as circles) represent individuals that belong to a same population, and each of the nodes is connected to an adjacent node through an edge. In FIG. 4, each of the edges is assigned with a corresponding edge weight, and an edge with a higher edge weight is drawn thicker. In addition, each of the evolutionary graphs 410 to 440 may include a hub (for example, an area framed by dashed lines in each of the evolutionary graphs 410 to 440) and branches. Details about the evolutionary graphs 410 to 440 may be found in Pavlogiannis, A., Tkadlec, J., Chatterjee, K. et al., "Construction of arbitrarily strong amplifiers of natural selection using evolutionary graph theory," *Commun Biol* 1, 71 (2018), and details in this regard will not be repeated herein. In different embodiments, each of the evolutionary graphs 410 to 440 may exist in various possible forms according to the needs of the designer, such as a specific data structure, template, etc.

In an embodiment, after the required first evolutionary graph is selected, the processor 104 may configure the first reference individuals obtained previously as first nodes in the first evolutionary graph and allocate the first reference individuals to the first evolutionary graph. For example, if it is assumed that each branch in the first evolutionary graph corresponds to a specific application field (the application field is, for example, smart manufacturing, self-driving vehicles, Internet of Things, smart medical care, smart transportation, etc.; the application field may be stored in parameter(s)/configuration value(s) or defined by the designer), the processor 104 may allocate the first reference individuals related to the specific application field to a corresponding branch in the first evolutionary graph, and allocate the first reference individuals that are not related to the specific application field to the hub of the first evolutionary graph. In other embodiments, the designer may adjust the method for allocating the first reference individuals into the first evolutionary graph according to design needs, but the disclosure is not limited thereto. In another embodiment, the processor 104 allocates the first reference individuals into the first evolutionary graph according to the parameter(s)/configuration value(s) of the first reference individuals.

Similarly, after the second fitness of each of the second reference individuals is determined, in step S317, the processor 104 may allocate the second reference individuals into the second evolutionary graph. In different embodiments, the designer may select a suitable evolutionary graph as the second evolutionary graph according to needs. In addition, the method for allocating the second reference individuals into the second evolutionary graph by the processor 104 may be found in the related description of allocating the first reference individuals into the first evolutionary graph, and details in this regard will not be repeated herein.

Next, in step S318, the processor 104 may reproduce a plurality of first offspring individuals in the first evolutionary graph. In addition, in step S319, the processor 104 may reproduce a plurality of second offspring individuals in the second evolutionary graph. In the embodiments of the disclosure, the first offspring individuals belong to a plurality of first generations, the second offspring individuals belong to a plurality of second generations, and each of the first offspring individuals and each of the second offspring individuals are evolved via a coevolution process.

Taking the first evolutionary graph as an example, the first evolutionary graph may be understood as including a plurality of first nodes, and each of the first nodes may be regarded as corresponding to an individual that belongs to the first population at the moment (for example, a certain first reference individual or an offspring thereof; the individual may have a corresponding first fitness). Specifically, new offspring of the individuals in the first population appear in the evolution process, and older individuals are eliminated in the evolution process. Under this circumstance, each of the first nodes in the first evolutionary graph is assumed to correspond to an individual that is not yet eliminated.

In an embodiment, during reproduction based on the first evolutionary graph, the processor 104 may be configured to execute: (a) selecting a first candidate individual (for example, a certain first reference individual or one of the offspring thereof) among the individuals that belong to the first population, and finding a first specific node that corresponds to the first candidate individual among the first nodes; (b) reproducing the first candidate individual to generate at least one second candidate individual (that is, an offspring of the first candidate individual), and replacing at least one adjacent node adjacent to the first specific node with at least one second specific node that corresponds to the second candidate individual based on the edge weight of each of the edges of the first specific node; (c) in response to determining that a cumulative evolution time (for example, a cumulative time calculated since the processor 104 obtained the first reference individual) reaches a time threshold (which may be determined by the designer according to needs), configuring the individuals included in the first population at the moment as the first offspring individuals, and in response to determining that the cumulative evolution time does not reach the time threshold, returning to step (a).

Figure 5:
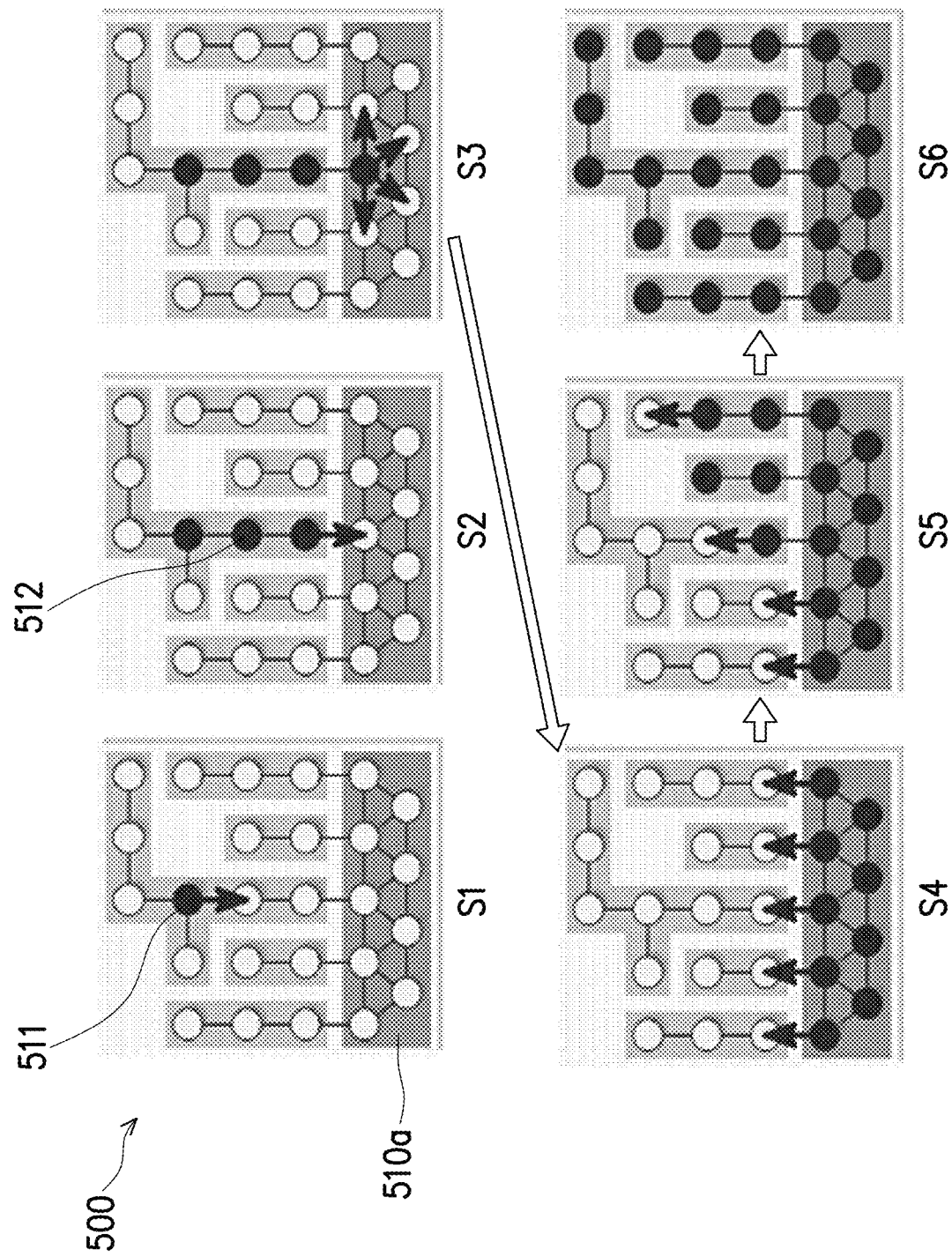
FIG. 5 is a schematic diagram of reproducing in the first evolutionary graph according to an embodiment of the disclosure.

Referring to FIG. 5, FIG. 5 is a schematic diagram of reproducing in the first evolutionary graph according to an embodiment of the disclosure. In FIG. 5, it is assumed that a considered first evolutionary graph 500 has the pattern shown (including several branches and a hub 510a), and each node (shown as a circle) is an individual included in the first population. In this embodiment, the probability of each of the individuals in the first population being selected as the first candidate individual may be positively correlated to a first fitness of each of the individuals.

As shown in FIG. 5, in an evolutionary stage S1, it is assumed that a certain first candidate individual is selected, the first candidate individual corresponds to a node 511 (that is, the first specific node), and the edge weight of the edge below the node 511 is larger. Under this circumstance, it is easier for a node 512 (that is, the second specific node) that corresponds to the second candidate individual (that is, the offspring of the first candidate individual) to replace the node originally located below the node 511 (that is, the node 511 spreads downward). Similarly, the node 512 may also spread further toward a lower node based on a similar manner, thereby forming the condition in stage S2.

In stage S3, when the offspring of the node 511 spread to the hub 510*a*, the offspring of the node 511 may gradually replace each of the nodes in the hub 510*a* through subsequent reproduction, as shown in stage S4. Next, the nodes in the hub 510*a* may continue to spread to other branches (as shown in stage S5), until the offspring of the node 511 completely replace the entire first evolutionary graph 500.

In the embodiment of the disclosure, details of the processor 104 configuring the second specific node in the first evolutionary graph 500 to replace the adjacent node may be found in descriptions of strong amplifiers in Pavlogiannis, A., Tkadlec, J., Chatterjee, K. et al., "Construction of Arbitrarily strong amplifiers of natural selection using evolutionary graph theory," *Commun Biol* 1, 71 (2018), and details in this regard will not be repeated herein.

Similarly, when reproducing based on the second evolutionary graph (which may correspond to individuals that belong to the second population at the moment), the processor 104 may also perform operations similar to steps (a) to (c). For example, the processor 104 may be configured to execute: (d) selecting a third candidate individual among the individuals that belong to the second population (for example, a certain second reference individual or an offspring thereof), and finding a third specific node that corresponds to the third candidate individual among the second nodes; (e) reproducing the third candidate individual to generate at least one fourth candidate individual (that is, an offspring of the third candidate individual), and replacing at least one adjacent node adjacent to the third specific node with at least one fourth specific node that corresponds to the fourth candidate individual based on the edge weight of each of the edges of the third specific node; (f) in response to determining that a cumulative evolution time (for example, a cumulative time calculated since the processor 104 obtained the second reference individual) reaches a time threshold (which may be determined by the designer according to needs), configuring the individuals included in the second population at the moment as the second offspring individuals, and in response to determining that the cumulative evolution time does not reach the time threshold, returning to step (d).

In different embodiments, the processor 104 may adopt different methods to reproduce the first/third candidate individual to generate the corresponding second/fourth candidate individual.

For example, in the first embodiment, (the first genes of) the selected first candidate individual may be configured to realize a corresponding closed-loop control, so as to obtain an actual OPEX and OPNF. Under this circumstance, after selecting the third candidate individual, the processor 104 may generate the fourth candidate individual by changing a part of the genes of the third candidate individual (that is, through mutation). The fourth candidate individual may be understood as a target OPEX and OPNF adopted in an open-loop control. In an embodiment, the processor 104 may configure the actual OPEX and OPNF as a basis for changing a part of the genes of the third candidate individual. For example, if the actual OPEX and OPNF are unsatisfactory, the processor 104 may correspondingly reduce the target OPEX and OPNF adopted in the open-loop control by the genes of the reproduced fourth candidate individual.

Next, when the processor 104 performs reproduction in the first population again, after the first candidate individual is selected, the second candidate individual may be generated by changing a part of the genes of the first candidate individual (that is, through mutation). The second candidate individual may be configured to realize another closed-loop control to obtain the actual OPEX and OPNF. In an embodiment, the processor 104 may configure the target OPEX and OPNF as a basis for changing a part of the genes of the first candidate individual. For example, if the target OPEX and OPNF are set high, the processor 104 may adjust a part of the genes when generating the second candidate individual so as to improve the OPEX and OPNF.

In this way, the first population and the second population of the first embodiment may form a pattern of cooperative coevolution during reproduction.

In the second embodiment, after a first candidate individual is selected from the first population (that is, the user behavior), the processor 104 may generate a second candidate individual by changing a part of the genes of the first candidate individual (that is, through mutation). The processor 104 may, for example, determine how to change the genes of the first candidate individual based on the genes of all the individuals in the second population (that is, the network topology) at the moment to generate the second candidate individual. For example, if all the individuals in the second population at the moment have a smaller number of RU, the processor 104 may correspondingly select a longer response time in the second candidate individual to set the gene of the "user experience," but the disclosure is not limited thereto.

Similarly, after a third candidate individual is selected in the second population (that is, network topology), the processor 104 may generate a fourth candidate individual by changing a part of the genes of the third candidate individual (that is, through mutation). The processor 104 may, for example, determine how to change the genes of the third candidate individual based on the genes of all the individuals in the first population (that is, the user behavior) at the moment to generate the fourth candidate individual. For example, if all the individuals in the second population at the moment are aimed to have a shorter reaction time, the processor 104 may select a slightly higher number of RU in the fourth candidate individual to set the gene of the "RU," but the disclosure is not limited thereto.

However, considering operational costs, operators generally do not always deploy hardware devices correspondingly based on every user requirement. For example, if the user behavior requires an increase of 10% in traffic, an increase of 5% in bandwidth, a decrease of 20% in latency, a decrease of 30% in power consumption, an increase of 40% in coverage, and an increase of 50% in connection stability, the fourth candidate individual generated by the processor 104 may not completely meet the requirements. Rather, the results are slightly lower than the requirements (for example, an increase of 10% in the number of nodes (instead of 20%), an increase of 20% in power consumption (instead of 30%), an increase of 25% in the number of links (instead of 35%), and an increase of 15% in heat generation (instead of 25%)).

In this way, the first population and the second population of the second embodiment may form a pattern of competitive coevolution during reproduction. In addition, since no evolutionary goals are set in the coevolution process in the first/second embodiment, the coevolution process may also be understood as an open coevolution.

In the embodiment of the disclosure, details of the processor 104 replacing the adjacent node with the fourth specific node in the second evolutionary graph may be found in descriptions of strong amplifiers in Pavlogiannis, A., Tkadlec, J., Chatterjee, K. et al., "Construction of Arbitrarily strong amplifiers of natural selection using evolutionary graph theory," *Commun Biol* 1, 71 (2018), and details in this regard will not be repeated herein.

After reproducing and obtaining a plurality of first offspring individuals of the first population according to the teaching, the processor 104 may execute step S320 to define the first offspring individuals as the first individuals. That is, when the first population continues to reproduce and reaches a corresponding time threshold, the processor 104 may regard the individuals that belong to the first population at the moment as the first individuals mentioned in step S210. Similarly, after reproducing and obtaining a plurality of second offspring individuals of the second population according to the teaching, the processor 104 may execute step S321 to define the second offspring individuals as the second individuals. That is, when the second population continues to reproduce and reaches a corresponding time threshold, the processor 104 may regard the individuals that belong to the second population at the moment as the second individuals mentioned in step S210.

Referring to FIG. 2 again, after the first individuals and the second individuals in step S210 are obtained according to the teaching, the processor 104 may execute step S220 to obtain a plurality of task networks generated by a plurality of pattern-producing networks.

In some embodiments, since the first individuals and the second individuals need to be configured as training data in subsequent operations, before executing step S220, the processor 104 may perform additional preprocessing to filter out a part of the first/second individuals that is unsuitable to be configured as training data, so as to facilitate the subsequent training, but the disclosure is not limited thereto.

In an embodiment, each of the pattern-producing networks is, for example, a compositional pattern-producing network (CPPN), and the processor 104 may use a Neuro-Evolution of Augmenting Topologies (NEAT) network to generate the pattern-producing networks. In some embodiments, NEAT may evolve and obtain the pattern-producing networks based on the HyperNEAT algorithm. In addition, the pattern-producing networks evolved from NEAT may be configured individually to generate a task network. Details of NEAT evolving and obtaining the pattern-producing networks and details of the pattern-producing networks generating the task networks individually may be found in the related documents of HyperNEAT, and details in this regard will not be repeated in herein.

Next, in step S230, the processor 104 may train each of the task networks with the first individuals and the second individuals based on a multi-target function, and evaluate an accuracy of each of the task networks after training.

In an embodiment, the first individuals and the second individuals may be manually corresponded (labeled) by related personnel based on a best practice, or may be automatically corresponded (labeled) by an algorithm. The best practice may be but is not limited to being derived from an intent, a past experience, or a theoretical derivation.

For example, regarding a certain user behavior A (that is, the first individuals) in the "user behavior" (that is, the first population), the processor 104 may find a network topology B in the "network topology" (that is, the second population) that should correspond to the user behavior A deemed by a certain designer and configure the network topology B as the corresponding second individual, and label the network topology B, but the disclosure is not limited thereto. In some embodiments, the corresponding relationship between the first individuals and the second individuals may be but is not limited to one-to-one (for example, a user behavior corresponding to a network topology) or many-to-one (for example, a plurality of user behaviors corresponding to a network topology).

Next, the processor 104 may train the task networks generated by each CPPN based on the first individuals and the second individuals that correspond to each other.

Figure 6:
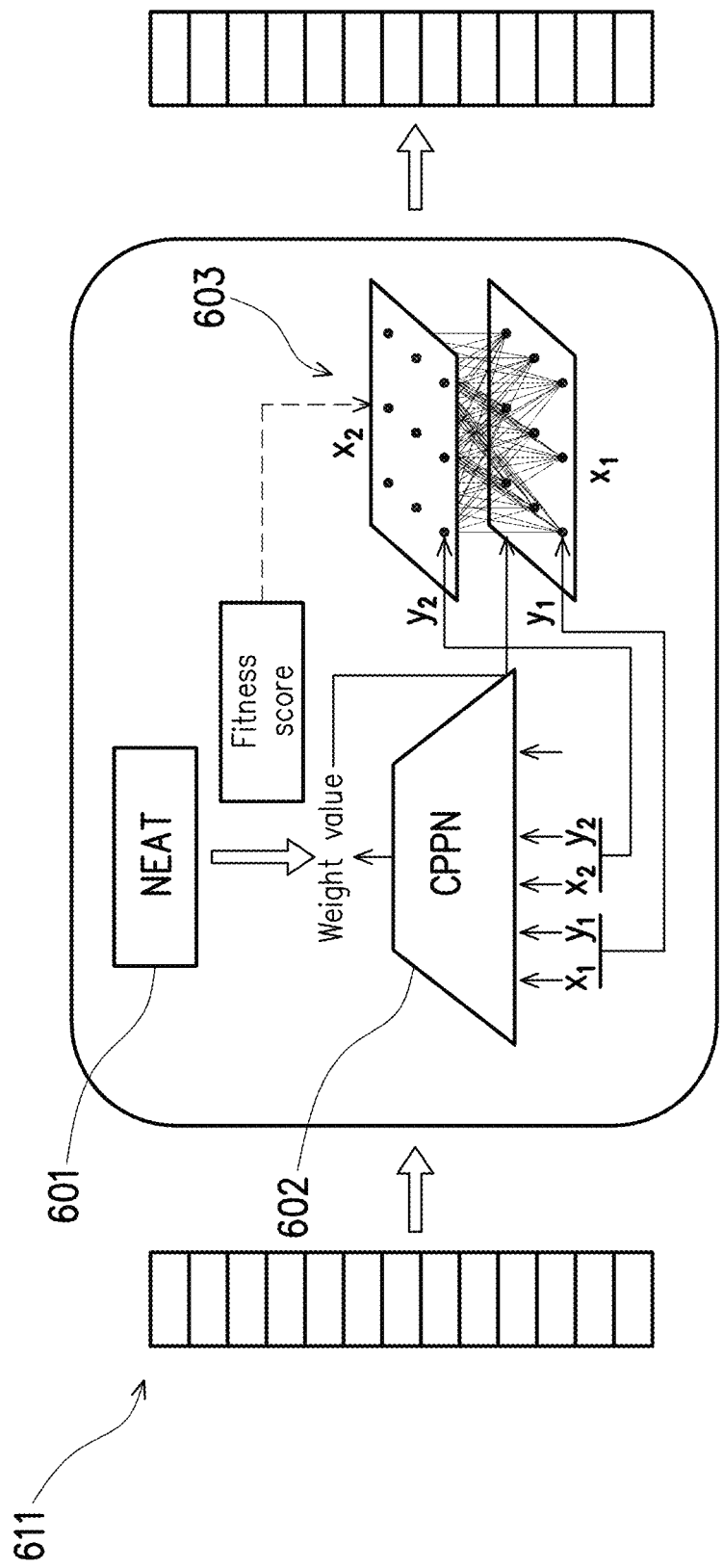
FIG. 6 is a schematic diagram of training task networks according to an embodiment of the disclosure.

Referring to FIG. 6, FIG. 6 is a schematic diagram of training the task networks according to an embodiment of the disclosure. As shown in FIG. 6, a CPPN 602 evolved by a NEAT network 601 may generate a task network 603.

In this embodiment, the task network 603 may be a two-layer network. Each of the layers may include a plurality of neurons, and the neurons in one layer only establish connections with the neurons in the other layer, and do not establish connections with the neurons in the same layer. A main difference between the task networks generated by different CPPNs lies in the fact that the two-layer networks have different connection modes, and that the weight of the neuron connections is updated during the training process of the task networks.

In FIG. 6, the task network 603 may define the positions of any two neurons based on a total of 4 input values, $(x_i, y_i)$, $(x_j, y_j)$, etc., and the output of the CPPN is the weight value of the connection between any two neurons in the task network 603. If the weight value is 0, it means that $(x_i, y_i)$ is not connected to $(x_j, y_j)$.

When training the task network 603, regarding a certain first individual C and a certain second individual D that correspond to each other, the processor 104 may convert the first individual C into a corresponding input feature vector 611 and input the input feature vector 611 to the task network 603 to train the task network 603. In an embodiment, after the task network 603 receives the input feature vector 611, the task network 603 may generate an output vector accordingly, and the processor 104 may adjust the weight of the neurons in the task network 603 to enable the output vector to be close to a feature vector that corresponds to the second individual D, but the disclosure is not limited thereto. For those skilled in the art, how to train the task networks 603 based on the first individuals and the second individuals that correspond to each other may be found in related technical documents, and details in this regard will not be repeated herein.

It is to be understood that, in different embodiments, the multi-target function adopted by the processor 104 when the processor 104 trains the task networks 603 may include a plurality of characteristics of each of the task networks 603.

Taking the first embodiment as an example, the multi-target function adopted by the processor 104 is, for example, $F(x)=M(f1(x), f2(x))=Norm(f1(x))+(1-Norm(f2(x)))$, in which $f1(x)$ may correspond to the target OPNF, and $f2(x)$ may correspond to the target OPEX. In addition, the Norm (x) operator may be configured to normalize x and limit x to be between 0 and 1.

As shown in the multi-target function of the first embodiment, a direction of the processor 104 training the task network 603 is toward a higher OPNF and a lower OPEX, but the disclosure is not limited thereto.

Taking the second embodiment as an example, the multi-target function adopted by the processor 104 is, for example, $F(x)=M(f1(x), f2(x), \ldots, fm(x))=(1-\text{Norm}(f1(x)))+(1-\text{Norm}(f2(x)))+(1-\text{Norm}(f3(x)))+(1-\text{Norm}(f4(x)))$, in which f1(x) may correspond to the number of nodes, f2(x) may correspond to the power consumption, f3(x) may correspond to the number of links, and f4(x) may correspond to the heat generation. As shown in the multi-target function of the second embodiment, the direction of the processor 104 training the task network 603 is toward a smaller number of nodes, a smaller amount of power consumption, a smaller number of links, and a smaller amount of heat generation, but the disclosure is not limited thereto.

Regarding each of the task networks generated by each of the CPPNs, the processor 104 may train each of the task networks according to the teaching. In addition, after completing the training of each of the task networks, the processor 104 may evaluate an accuracy of each of the task networks. In an embodiment, the accuracy of each of the task networks may be understood as, for example, the closeness between each of the task networks and the desired target in the multi-target function. That is, the closer each of the task networks is to the target set in the multi-target function, the higher the accuracy of each of the task networks. In different embodiments, the accuracy is, for example but not limited to, a training accuracy or a testing accuracy.

After evaluating the accuracy of each of the task networks, in step S240, the processor 104 may determine a fitness score of a corresponding pattern-producing network based on the accuracy of each of the task networks. Taking FIG. 6 as an example, after evaluating the accuracy of the task network 603, the processor 104 may determine the fitness score of the CPPN 602 accordingly. In an embodiment, the fitness score of a CPPN 602 may be positively correlated to an accuracy of a task network 603 that corresponds to the CPPN 602. That is, the higher the accuracy of the task network 603, the higher the fitness score of the CPPN 602, and vice versa. In another embodiment, an accuracy is converted into a fitness score according to needs. For example, the total accuracy of the task networks 603 evaluated may be converted into the fitness score of the CPPNs 602; weights may be assigned to the accuracy, correlation coefficients may be assigned to the accuracy, or a preset value may be added to the accuracy and the accuracy and the preset value may be added together, depending on design needs, and the disclosure is not limited thereto.

Next, in step S250, the processor 104 may find a specific pattern-producing network among the pattern-producing networks based on the fitness score of each of the pattern-producing networks, and select a specific task network that corresponds to the specific pattern-producing network among the task networks. In an embodiment, the processor 104 may find a pattern-producing network with the highest fitness score among the pattern-producing networks and configure the pattern-producing network as the specific pattern-producing network. For example, if it is assumed that the CPPN 602 has a highest fitness score among the pattern-producing networks evolved by a NEAT network 601, the processor 104 may select the task network 603 as the specific task network accordingly, but the disclosure is not limited thereto.

Next, the processor 104 may only retain the specific pattern-producing network found and the task network generated from the specific pattern-producing network, and eliminate the remaining CPPNs and task networks. For a clear description, the CPPN 602 and the task network 603 are used as examples of the specific pattern-producing network and the specific task network, respectively, but the disclosure is not limited thereto.

Next, in different embodiments, the specific task network may be configured to conduct reasoning correspondingly on how to set action(s) of the instance of the second population based on the obtained sensing data of the first population (for example, the parameter(s)/configuration value(s) of the closed-loop control in the first embodiment and the parameter(s)/configuration value(s) of user behavior in the second embodiment).

Figure 7:
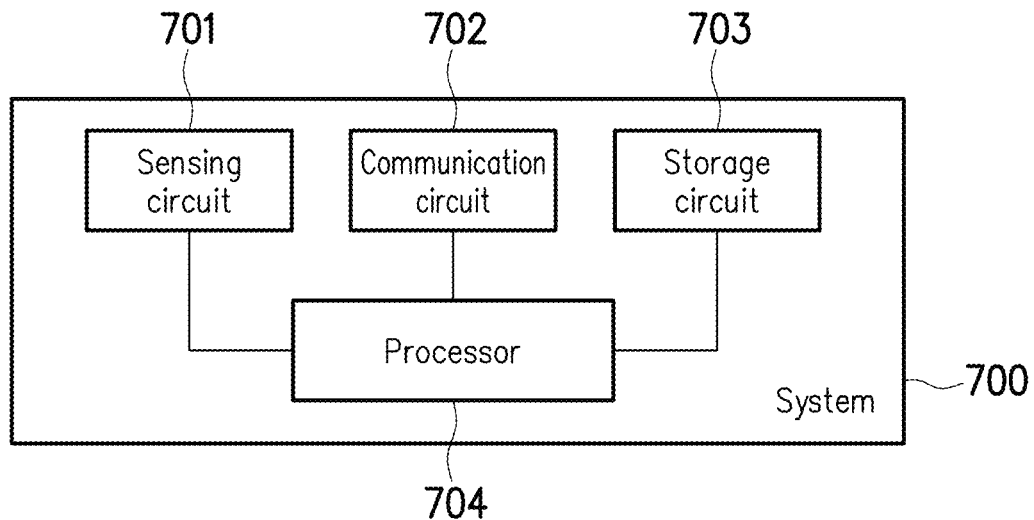
FIG. 7 is a schematic diagram of a system for determining action(s) based on sensing data according to an embodiment of the disclosure.

Referring to FIG. 7, FIG. 7 is a schematic diagram of a system for determining action(s) based on sensing data according to an embodiment of the disclosure. In FIG. 7, a system 700 may include a sensing circuit 701, a communication circuit 702, a storage circuit 703, and a processor 704. In an embodiment, the sensing circuit 701 may be configured to obtain related parameter(s)/configuration value(s) of a certain instance of the closed-loop control in the first embodiment, or related parameter(s)/configuration value(s) of a certain instance of the user behavior in the second embodiment. In addition, the communication circuit 702 may be, for example, various types of wireless transceivers, and may send signals/commands to designated devices under the control of the processor 704.

Various possible implementations of the storage circuit 703 and the processor 704 may be found in the descriptions of the storage circuit 102 and the processor 104, and the details in this regard will not be repeated in herein.

Figure 8:
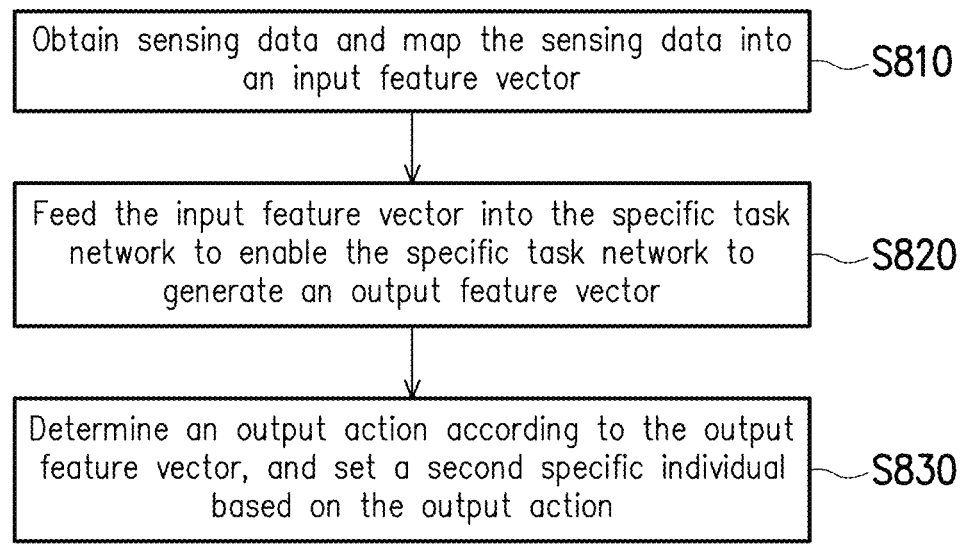
FIG. 8 is a flowchart of a method for determining action(s) based on sensing data according to an embodiment of the disclosure.
Figure 9:
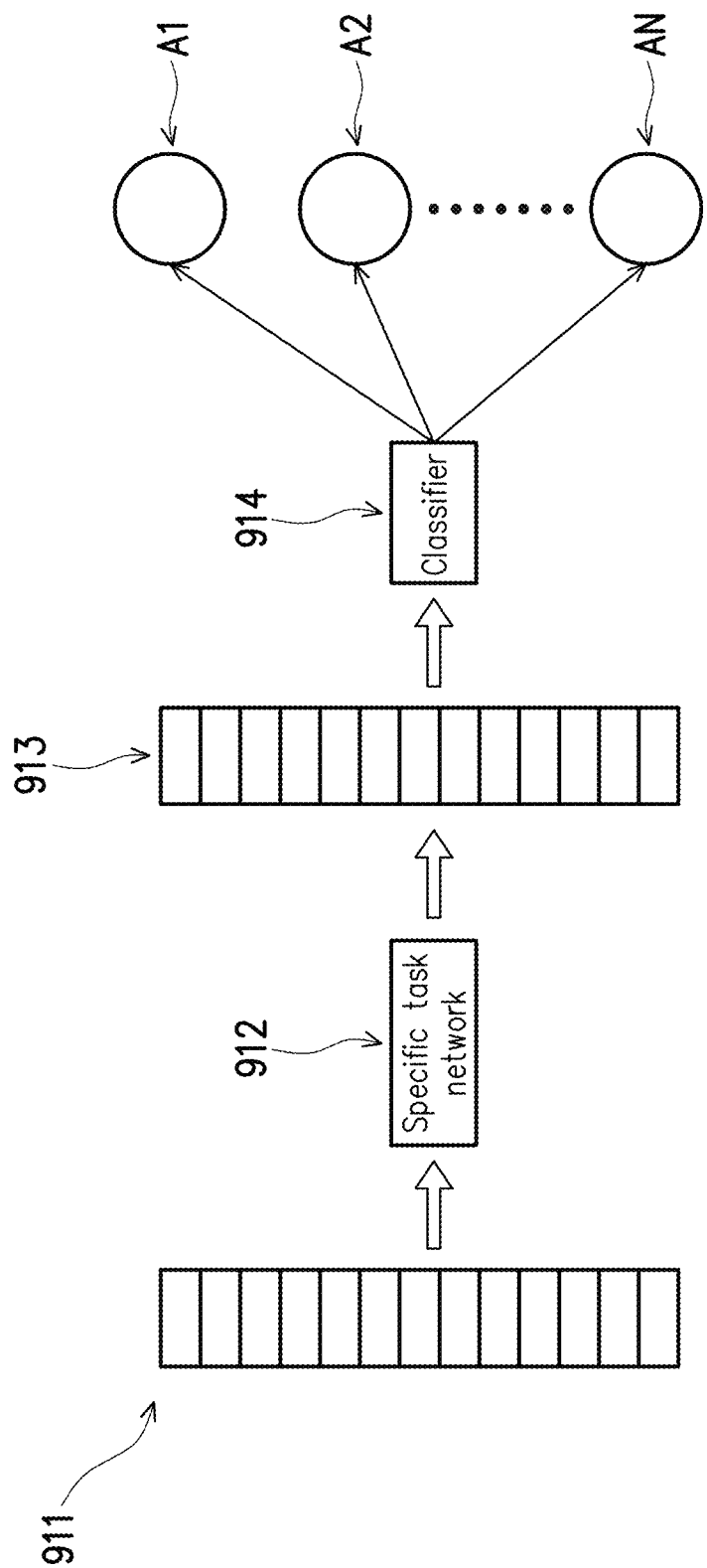
FIG. 9 is a schematic diagram of determining action(s) based on sensing data according to an embodiment of the disclosure.

Referring to FIG. 8, FIG. 8 is a flowchart of a method for determining action(s) based on sensing data according to an embodiment of the disclosure. The method of this embodiment may but is not limited to be executed by the processor 704 shown in FIG. 7. In addition, for a clear description of the content of FIG. 8, the following provides further description with reference to FIG. 9. FIG. 9 is a schematic diagram of determining action(s) based on sensing data according to an embodiment of the disclosure.

First, in step S810, the processor 704 may obtain sensing data and map the sensing data into an input feature vector 911. The sensing data may include a plurality of sensing attributes that belong to a first specific individual, and the first specific individual may belong to the first population (for example, the "closed-loop control" in the first embodiment or the "user behavior" in the second embodiment).

For example, in the first embodiment, the sensing data may be a control function of a certain closed-loop control instance or related parameter(s)/configuration value(s) of a trained model. In addition, in the second embodiment, the sensing data may be, for example, related parameter(s)/configuration value(s) of a certain user behavior instance (such as a specific user experience, user habit, user type, user density, and user context).

In different embodiments, the sensing data may be provided by other devices connected to the system 700, but the disclosure is not limited thereto. After obtaining the sensing data, the processor 104 may map the sensing data into the input feature vector 911 that may be configured to be input into a specific task network 912 (for example, the task network 603). Related details in mapping may be found in related technical documents, and details in this regard will not be repeated herein.

Next, in step S820, the processor 704 may feed the input feature vector 911 into the specific task network 912 (for example, the task network 603 may be provided by the processor 104 to the system 700) to enable the specific task network 912 to generate an output feature vector 913.

In the first embodiment, the output feature vector 913 is, for example, a feature vector that corresponds to a combination of related parameter(s)/configuration value(s) of a certain open-loop control. In addition, in the second embodiment, the output feature vector 913 is, for example, a feature vector that corresponds to a combination of related parameter(s)/configuration value(s) of a certain network topology (for example, a graph convolutional network (GCN) feature).

Next, in step S830, the processor 704 may determine an output action according to the output feature vector 913, and set a second specific individual based on the output action. The second specific individual may belong to the second population (for example, the "open-loop control" in the first embodiment or the "network topology" in the second embodiment).

In an embodiment, the processor 704 may set the second specific individual directly with an output action that completely corresponds to the output feature vector 913. For example, in the first embodiment, after generating the output feature vector 913 that corresponds to a certain combination of parameters/configuration values of a certain open-loop control, the processor 704 executes a corresponding open-loop control with the combination of parameters/configuration values of the open-loop control. Another example would be that in the second embodiment, after generating the output feature vector 913 that corresponds to a combination of parameters/configuration values of a certain network topology, the processor 704 may set the network topology with the combination of parameters/configuration values of the network topology or construct the network topology based on a feature vector after conversion.

However, setting the second specific individual with the output action that completely corresponds to the output feature vector 913 may lack flexibility to a certain extent. Therefore, the embodiment of the disclosure further proposes using a classifier 914 to determine the output action based on the output feature vector 913, so as to improve flexibility in execution.

In an embodiment, the processor 704 may input the output feature vector 913 into the classifier 914, to enable the classifier 914 to find a specific action that corresponds to the output feature vector 913 among a plurality of preset actions A1 to AN. Next, the processor 704 may define the specific action found as the output action.

In some embodiments, the classifier 914 (for example, a support vector machine (SVM)) may be obtained through training via a certain training process. For example, regarding various output feature vectors generated by the specific task network 912, the designer may predetermine (that is, label) which one of the preset actions A1 to AN each of the output feature vectors should correspond to. Each of the preset actions A1 to AN may include action(s) that completely correspond to a certain output feature vector, and may also be include other action(s) that the designer would like to execute.

In this way, after completing the training of the classifier 914, when the classifier 914 receives the output feature vector 913, the classifier 914 may find the specific action that corresponds to the output feature vector 913 among the preset actions A1 to AN accordingly. The specific action may include the action(s) that completely correspond to the output feature vector 913, and may also include other additional action(s), so as to improve flexibility in execution.

For example, in the first embodiment, after generating the output feature vector 913 that corresponds to a combination of parameters/configuration values of a certain open-loop control, the processor 704 may enable the classifier 914 to find the specific action that corresponds to the output feature vector 913 among the preset actions A1 to AN. In the first embodiment, the specific action includes related actions of executing the corresponding open-loop control with the combination of parameters/configuration values of the open-loop control, and may also include other action(s) that may be executed together deemed by the designer, but the disclosure is not limited thereto.

Another example would be that in the second embodiment, after generating an output feature vector 913 that corresponds to a combination of parameters/configuration values of a certain network topology, the processor 704 may enable the classifier 914 to find a specific action that corresponds to the output feature vector 913 among the preset actions A1 to AN. In the second embodiment, the specific action includes related action(s) of setting the network topology with the combination of parameters/configuration values of the network topology, and may also include other action(s) that may be executed together deemed by the designer, but the disclosure is not limited thereto.

In an embodiment, after determining the output action, the processor 704 may control the communication circuit 702 to send the output action to the second specific individual that belongs to the second population, so as to set the second specific individual accordingly. For example, in the second embodiment, the second specific individual is, for example, a network topology instance, which may be adjusted to a network described by a vector formed by features of GCN after a conversion according to the output action. Accordingly, a new 5G network topology once again affects the user behavior.

Figure 10:
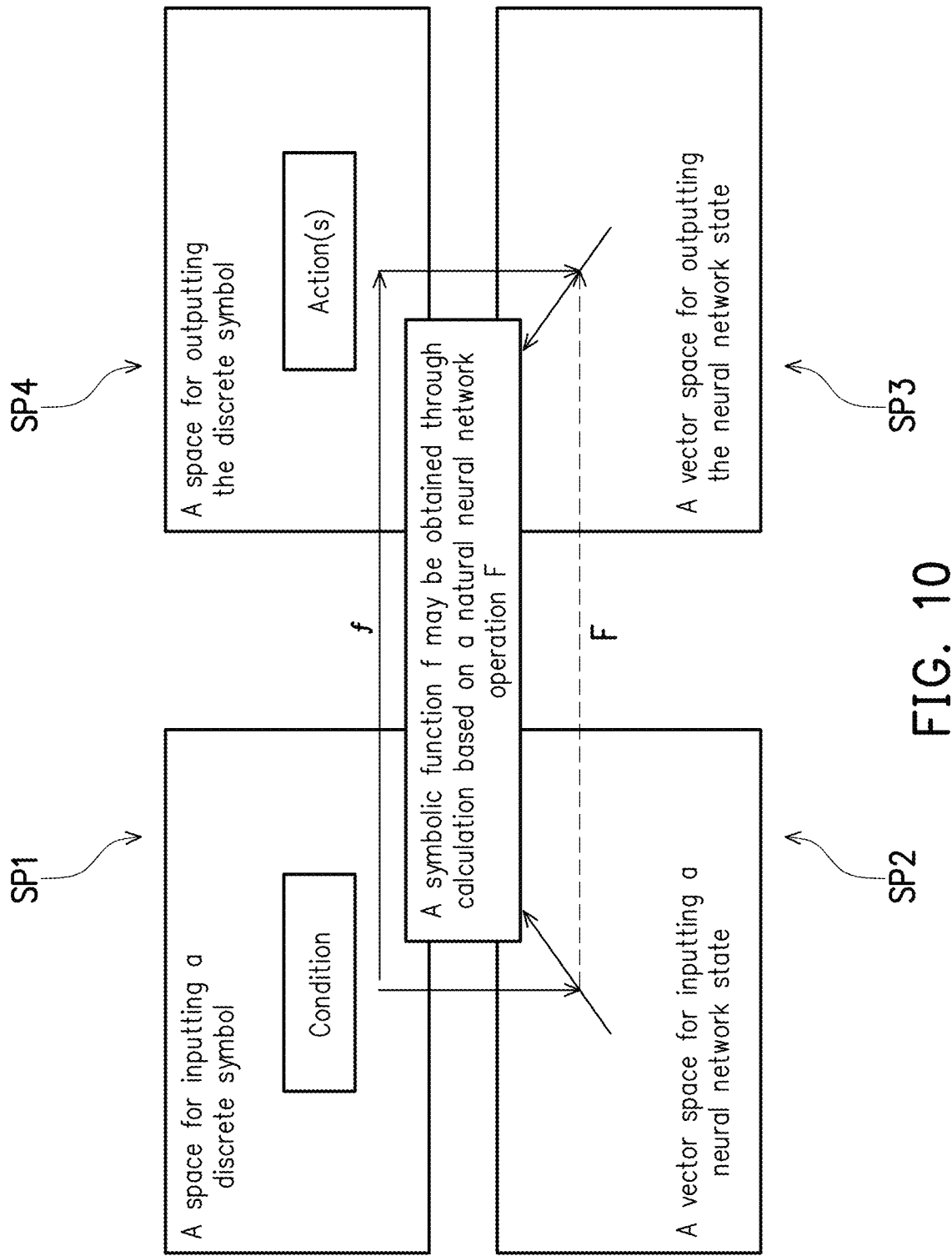
FIG. 10 is a schematic diagram of evolutionary symbolic computation according to an embodiment of the disclosure.

Referring to FIG. 10, FIG. 10 is a schematic diagram of evolutionary symbolic computation according to an embodiment of the disclosure. In an embodiment, an operation performed by the embodiment of the disclosure may be roughly understood as using a symbolic function f to determine action(s) that belong to a space SP4 (for example, the output action) based on a condition of a space SP1 (for example, the input feature vector 911). However, in essence, the operation performed by the embodiment of the disclosure is sequential actions of converting the condition that belongs to the space SP1 into the first vector in the space SP2, converting the first vector into a second vector that belongs to a space SP3, and converting the second vector into the action(s) that belongs to the space SP4. In an embodiment, a function F shown in FIG. 10 may be understood as corresponding to the specific task network in the embodiments described above. The function F may convert the first vector that belongs to the space SP2 into the second vector that belongs to the space SP3, but the disclosure is not limited thereto.

From another point of view, in current technologies, planning or reasoning is mostly conducted by a rule engine. In the disclosure, planning or reasoning is completed by training based on big data, and there is no need to set rules manually.

In summary, the method for training and selecting the task network based on the coevolution mechanism of the embodiments of the disclosure may be roughly understood as including two stages: (1) generating a plurality of first individuals that belong to the first population and a plurality of second individuals that belong to the second population through the open coevolution process; (2) training the task network of each of the pattern-producing networks based on the first/second individuals, and finding the specific pattern-producing network with the highest fitness score and the specific task network generated by the specific pattern-producing network with the highest fitness score.

In the first stage, the embodiments of the disclosure introduce the concept of the evolutionary graph and the strong amplifier. In this way, the offspring of individuals with a higher fitness in the populations are more likely to spread to the entire evolutionary graph to facilitate fixation. In this way, the first/second individuals obtained through reproduction may have favorable genes, thereby facilitating the training of each of the task networks in the second stage.

In addition, in the second stage, since the fitness score of each of the pattern-producing networks is determined based on the accuracy of the corresponding task network, and the specific pattern-producing network selected is, for example, one with the highest fitness score, the corresponding task network may be configured as the specific task network that determines action(s) based on the sensing data subsequently.

In this way, when the sensing data that correspond to the first population is obtained, the specific task network and the classifier may determine the appropriate output action accordingly, so as to increase the OPNF/decrease the OPEX in the first embodiment and adjust the related parameter(s)/configuration value(s) of the network topology according to the user behavior in the second embodiment.

Although the disclosure has been disclosed in the embodiments described above, the embodiments are not used to limit the disclosure. Those skilled in the art may make some changes and modifications without departing from the spirit and scope of the disclosure. Therefore, the scope of protection of the disclosure shall be subject to the scope defined by the attached claims.

What is claimed is:

1. A method for training and selecting a task network based on a coevolution mechanism, comprising:
    obtaining a plurality of first individuals that belong to a first population and a plurality of second individuals that belong to a second population, wherein the plurality of first individuals and the plurality of second individuals correspond to each other and are evolved via a coevolution process, wherein the coevolution process comprises one of the following: a cooperative coevolution and a competitive coevolution;
    obtaining a plurality of task networks generated by a plurality of pattern-producing networks, wherein each task network of the plurality of task networks includes a first network layer and a second network layer, the first network layer and the second network layer include a plurality of nodes, and the plurality of nodes of the first network layer is connected to the plurality of nodes of the second network layer based on a weight value initialized by a corresponding pattern-producing network;
    training the each task network with the plurality of first individuals and the plurality of second individuals based on a multi-target function, wherein the training regarding a first individual and a second individual comprising: feeding an input feature vector corresponding to the first individual into the each task network to generate an output feature vector and adjusting the weight value to enable the output feature vector to be close to a feature vector that corresponds to the second individual, and evaluating an accuracy of the each task network after the training, wherein the multi-target function comprises a plurality of characteristics of the each task network;
    determining a fitness score of the corresponding pattern-producing network based on the accuracy of the each task network, wherein the fitness score is positively correlated to the accuracy of the each task network; and
    finding a specific pattern-producing network with highest fitness score from among the plurality of pattern-producing networks, and selecting a specific task network that corresponds to the specific pattern-producing network, wherein the specific task network is selected from among the plurality of task networks.

2. The method according to claim 1, wherein obtaining the plurality of first individuals that belong to the first population comprises:
    obtaining a plurality of first reference individuals that belong to the first population, wherein each first reference individual of the plurality of first reference individuals has a plurality of first genes;
    determining a first fitness of the each first reference individual based on the first genes of the each first reference individual;
    allocating the plurality of first reference individuals to a first evolutionary graph, and reproducing a plurality of first offspring individuals in the first evolutionary graph, wherein each first offspring individual of the plurality of first offspring individuals and a plurality of second offspring individuals that belong to the second population are reproduced via the coevolution process; and
    defining the plurality of first offspring individuals as the plurality of first individuals.

3. The method according to claim 2, wherein obtaining the plurality of second individuals that belong to the second population comprises:
    obtaining a plurality of second reference individuals that belong to the second population, wherein each second reference individual of the plurality of second reference individuals has a plurality of second genes;
    determining a second fitness of the each second reference individuals based on the second genes of the each second reference individuals;
    allocating the plurality of second reference individuals to a second evolutionary graph, and reproducing the plurality of second offspring individuals in the second evolutionary graph, wherein the plurality of second offspring individuals and the plurality of first offspring individuals are reproduced via the coevolution process; and
    defining the plurality of second offspring individuals as the plurality of second individuals.

4. The method according to claim 3, wherein obtaining the plurality of first reference individuals that belong to the first population and obtaining the plurality of second reference individuals that belong to the second population comprises:
    randomly generating a plurality of first initial individuals that belong to the first population, and randomly generating a plurality of second initial individuals that belong to the second population; and
    finding the plurality of first reference individuals from among the plurality of first initial individuals based on a novelty search algorithm, and finding the plurality of second reference individuals from among the plurality of second initial individuals based on the novelty search algorithm, wherein the first genes of each first reference individual of the plurality of first reference individuals satisfy a first minimal criterion, and the second genes of each second reference individual of the plurality of second reference individuals satisfy a second minimal criterion.

5. The method according to claim 2, wherein the first evolutionary graph comprises a plurality of first nodes, the plurality of first nodes correspond to a plurality of individuals that belong to the first population, each of the first nodes is connected to an adjacent node through at least one edge, and the at least one edge is assigned an edge weight, wherein the method comprises:
   (a) selecting a first candidate individual among the plurality of individuals that belong to the first population, and finding a first specific node that corresponds to the first candidate individual among the plurality of first nodes;
   (b) reproducing the first candidate individual to generate at least one second candidate individual, and replacing at least one adjacent node adjacent to the first specific node with at least one second specific node that corresponds to the at least one second candidate individual based on the edge weight of the at least one edge of the first specific node; and
   (c) configuring the plurality of individuals comprised in the first population as the plurality of first offspring individuals in response to determining that a cumulative evolution time reaches a time threshold, and returning to (a) in response to determining that the cumulative evolution time does not reach the time threshold.

6. The method according to claim 5, wherein a probability that the first candidate individual is selected is positively correlated to a fitness of the first candidate individual.

7. The method according to claim 5, wherein the plurality of individuals that belong to the first population are recorded in a first population queue, the first population queue has a preset capacity, and the method further comprises:
   in response to determining that a total number of the plurality of individuals that belong to the first population and the at least one second candidate individual is greater than the preset capacity, obtaining a difference between the total number and the preset capacity; and
   removing a part among the plurality of individuals that is oldest from the first population queue, and adding the at least one second candidate individual to the first population queue, wherein a number of the part among the plurality of individuals corresponds to the difference.

8. The method according to claim 1, wherein each pattern-producing network of the plurality of pattern-producing networks is a compositional pattern-producing network, and obtaining the plurality of pattern-producing networks comprises:
   using a NeuroEvolution of Augmenting Topologies network to generate the plurality of pattern-producing networks.

9. The method according to claim 1, wherein the specific pattern-producing network has a highest fitness score among the plurality of pattern-producing networks.

10. The method according to claim 1, wherein the accuracy comprises a training accuracy or a testing accuracy.

11. A method for determining actions based on sensing data, comprising:
   obtaining a plurality of first individuals that belong to a first population and a plurality of second individuals that belong to a second population, wherein the plurality of first individuals and the plurality of second individuals are evolved via a coevolution process, wherein the coevolution process comprises one of the following: a cooperative coevolution and a competitive coevolution;
   obtaining a plurality of task networks generated by a plurality of pattern-producing networks, wherein each task network of the plurality of task networks includes a first network layer and a second network layer, the first network layer and the second network layer include a plurality of nodes, and the plurality of nodes of the first network layer is connected to the plurality of nodes of the second layer based on a weight value initialized by a corresponding pattern-producing network;
   obtaining sensing data and mapping the sensing data into an input feature vector, wherein the sensing data comprise a plurality of sensing attributes that belong to a first specific individual, and the first specific individual belongs to the first population;
   feeding the input feature vector into a specific task network among the plurality of task networks, so that the specific task network generates an output feature vector, wherein the specific task network is trained based on the first population and the second population, wherein the weight value of the specific task network is adjusted during training based on the plurality of first individuals and the plurality of second individuals that are coevolved, wherein the specific task network corresponds to a specific pattern-producing network with highest fitness score among the plurality of pattern-producing networks, wherein the fitness score of a pattern-producing network of the plurality of pattern-producing networks is determined based on an accuracy of the each task network that corresponds to the pattern-producing network, wherein the accuracy is evaluated after training the each task network; and
   determining an output action according to the output feature vector, and setting a second specific individual based on the output action, wherein the second specific individual belongs to the second population.

12. The method according to claim 11, wherein determining the output action according to the output feature vector comprises:
   feeding the output feature vector into a classifier, so that the classifier finds a specific action that corresponds to the output feature vector among a plurality of preset actions; and
   defining the specific action as the output action.

13. A system that determines actions based on sensing data, comprising:
   a sensing circuit;
   a communication circuit;
   a storage circuit, recording a plurality of modules; and
   a processor, coupled to the storage circuit, and accessing the plurality of modules to execute the following:
   obtaining a plurality of first individuals that belong to a first population and a plurality of second individuals that belong to a second population, wherein the plurality of first individuals and the plurality of second individuals are evolved via a coevolution process, wherein the coevolution process comprises one of the following: a cooperative coevolution and a competitive coevolution;
   obtaining a plurality of task networks generated by a plurality of pattern-producing networks, wherein each task network of the plurality of task networks includes a first network layer and a second network layer, the first network layer and the second network layer include a plurality of nodes, and the plurality of nodes of the first network layer is connected to the plurality of nodes of the second layer based on a weight value initialized by a corresponding pattern-producing network;

obtaining sensing data from the sensing circuit, and mapping the sensing data into an input feature vector, wherein the sensing data comprise a plurality of sensing attributes that belong to a first specific individual, and the first specific individual belongs to the first population;

feeding the input feature vector into a specific task network among the plurality of task networks so that the specific task network generates an output feature vector, wherein the specific task network is trained based on the first population and the second population, and the weight value of the specific task network is adjusted during training based on the plurality of first individuals and the plurality of second individuals that are coevolved, wherein the specific task network corresponds to a specific pattern-producing network with highest fitness score among the plurality of pattern-producing networks, wherein the fitness score of a pattern-producing network of the plurality of pattern-producing networks is determined based on an accuracy of the each task network that corresponds to the pattern-producing network, wherein the accuracy is evaluated after training the each task network; and determining an output action according to the output feature vector, and controlling the communication circuit to send the output action to a second specific individual that belongs to the second population, wherein the output action is configured to set the second specific individual.

14. The system according to claim 13, wherein the processor is configured to: feed the output feature vector into a classifier, so that the classifier finds a specific action that corresponds to the output feature vector among a plurality of preset actions; and define the specific action as the output action.

15. The system according to claim 13, wherein the processor is configured to:

train each task network of the plurality of task networks with the plurality of first individuals and the plurality of second individuals based on a multi-target function, and evaluating the accuracy of the each task network after training, wherein the multi-target function comprises a plurality of characteristics of the each task network;

determine a fitness score of the corresponding pattern-producing network based on the accuracy of the each task network, wherein the fitness score is positively correlated to the accuracy of the each task network that corresponds to the pattern-producing network; and find the specific pattern-producing network from among the plurality of pattern-producing networks based on the fitness score, and select the specific task network that corresponds to the specific pattern-producing network, wherein the specific task network is selected from among the plurality of task networks.

* * * * *